United States Patent Office 3,437,651
Patented Apr. 8, 1969

3,437,651
METAL-1,3-DIPHENYLTRIAZENE DERIVATIVES AND THEIR PREPARATION
Frederick E. Brinckman, Washington, D.C., and Hermann S. Haiss, Indian Head, Md., assignors to the United States of America as represented by the Secretary of the Navy
No Drawing. Filed May 14, 1964, Ser. No. 367,599
Int. Cl. C07f 7/00, 5/06, 7/22
U.S. Cl. 260—140                                6 Claims

ABSTRACT OF THE DISCLOSURE

A metal-1,3-diphenyltriazene and the method for its preparation in which silver-1,3-diphenyltriazene is reacted with an organic metal halide in the presence of a diluent such as benzene.

---

The invention described herein may be manufactured and used by or for the Government of the United States of America for governmental purposes without the payment of any royalties thereon or therefor.

This invention relates to novel organometallic compounds and preparation thereof. In particular, the invention is directed to a simplified procedure for preparing novel metal-1,3-diorganotriazen compounds which may be represented by the following general formula:

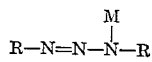

where R is a substituted or unsubstituted aliphatic or aromatic organic radical so long as any substituent thereon is incapable of reacting with a metal halide and M is a metal-containing moiety. Specifically, the invention is directed to metal-triazen compounds of the above general structure wherein R is a phenyl radical and M is a metal.

In the past, certain metallo-triazen derivatives have been prepared by a method which involved the reaction of a free triazene with a metallic salt, such as for example a metallic halide. In the presence of an alcoholic or ketonic reaction medium. For example, diphenyltriazene compounds of Na, Ag, Hg, Cu, Ni and Pd have been prepared in this manner. This method, however, suffered from a serious drawback since the variety of metal compounds which could be prepared thereby was severely limited. Since alcoholic or ketonic diluents were necessarily used, the reaction was limited to the preparation of the above-disclosed metallic derivatives because of among others, the difficulties encountered in removing the solvent of crystallization from the product. Moreover, the use of salts, such as for example halides, of metals was excluded because of the tendency of side reactions, involving preferential formation of metal-oxygen bonds, to prevail. For example, the preparation of triazene derivatives containing metals such as B, Al, P, Sn, Ti, Zr, Fe, and the like were not possible by the prior method.

Accordingly, it has now been unexpectedly found that 1,3-diphenyltriazeno silver will undergo methathetical exchange with a wide variety of metal halides and organometal halides to provide a silver salt and the metal-1,3-diphenyltriazene.

Starting Materials

The initial reactants are 1,3-diphenyltriazeno silver (Ag(dpt)) and compounds of the formula $MX_n$ or $R_nMX_m$ wherein M is a metal of Groups I–VIII of the Periodic Table, R is alkyl, aryl, aralkyl, alkaryl or any combination thereof whether substituted or unsubstituted, X is Cl, Br or I and $m$ and $n$ are integers. Exemplary compounds represented by the formula $MX_n$ are the chlorides, bromides and iodides of Al, Sn, Cd, Ti, Zr and Fe, all of such halides being considered essentially equivalent for present purposes.

The metal may be a metal of Groups I–VIII of the Periodic Table. Table I below sets forth an exemplary, but not all inclusive, list of the metals which come within the scope and contemplation of the invention:

TABLE I.—GROUPS OF THE PERIODIC TABLE

| I  | II | III | IV | V  | VI | VII | VIII |
|----|----|-----|----|----|----|-----|------|
| Cu | Be | Sc  | Ti | V  |    | Mn  | Fe   |
|    | Mg | B   | Zr | P  | W  |     | Co   |
|    | Sr | Al  | Hf | As |    |     | Ni   |
|    | Zn | Ga  | Ge | Sb | Te |     | Pd   |
|    | Cd | In  | Sn | Ni |    |     | Pt   |
|    | Hg | Tl  | Pb |    |    |     |      |

As set forth above, the organic radical of the organometal halide may be alkyl, aryl, aralkyl or alkaryl or any combination thereof whether substituted or unsubstituted. For example, the organic radical may be a phenyl group or a substituted phenyl group such as toluene or other similar higher homologs or the organic radical may be an aliphatic radical such as, for example, ethyl, propyl, butyl and higher homologs thereof. Moreover, mixtures of organometal halides such as aryl metal halides and alkyl metal halides may be used. The only limitation on the organic radical of the organometal halide is that the organic radical must not contain substituents, such as hydroxyl groups, which will react with metal halides. The presence of such reactive groups will lead to the formation of undesirable side reactions and their concomitant products. Exemplary organometal halides are dimethyl tin dichloride, phenyl tin trichloride, and triphenyl tin chloride.

The molar ratio of the reactants is not critical, it being only necessary that there be one mole of triazeno-silver compound present for each mole of halide to be replaced. Generally, a slight excess of the triazeno-silver compound is used.

Reaction Conditions

Although the reaction involved in the present invention is one of simple metathetical exchange, there are certain conditions which must be met in order to insure success.

The temperature at which the reaction is maintained is noncritical and may range from about 30° C. down to about the freezing point of the diluent. Ambient temperature is, however, preferred in all instances.

Because of the tendency of the metal halides and organometal halides used herein to react with oxygen and many oxygen-containing compounds to form metal-oxygen bonds, the reaction must be run under anhydrous conditions and in an inert and nonoxygen-containing atmosphere. Inert atmospheres of helium, nitrogen or argon are preferably used.

Diluents

The diluents used in the process of this invention may be any diluent which is nonreactive with a metal halide. For example, any absolute hydrocarbon, such as for example hexane, heptane, cyclohexane, benzene, toluene, xylene and similar hydrocarbons may be used. The preferred diluents are ethyl ether, benzene and petroleum ether.

The invention will be more fully illustrated by the following examples. It is to be understood, however, that the examples are only illustrative of the general nature of the invention and are not intended to be construed as limitations thereon.

EXAMPLE 1

This example illustrates the general procedure of the invention which consists of shaking an anhydrous metal halide (or organometal halide) with a slight excess of silver diphenyltriazene (Ag(dpt)) in a dry hydrocarbon diluent under an inert atmosphere at room temperature.

Into a 500 ml., 2-necked flask, suitable for mechanical shaking, there was added 6.1 g. (20 mmoles) of Ag(dpt). The flask was flushed with nitrogen and 400 ml. of benzene (dried over Na) was then introduced. With careful exclusion of air and moisture, 0.8 g. (6 mmoles) of $AlCl_3$ was placed in a small receiver fitted to the larger neck of the flask. The mixture was shaken by hand to insure complete transfer of the $AlCl_3$ into the reaction vessel, the apparatus was stoppered and mechanical shaking was commenced. After about 20 hours, agitation was stopped and the contents of the flask were filtered under inert atmosphere in order to separate AgCl and unreacted Ag(dpt) from the filtrate. The solvent was removed from the filtrate by vacuum and the product, tris-(1,3-diphenyltriazeno)aluminum, was recovered. Further purification is effected by recrystallization.

Table 2, below, sets forth the analysis of the product of Example 1 and also discloses analyses of novel compounds obtained by Examples 2–9 which were identical with the procedure of Example 1.

Example 8.—Tetrakis(-1,3 - diphenyltriazeno)zirconium (IV)

Example 9.—Tris(-1,3-diphenyltriazeno)iron (III)

The scope of the invention is not limited to the above-listed type compounds since in the general formula

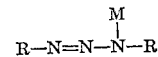

M may be a metal or a metal-containing group. For example, the metal atom may be additionally attached to further triazen groups or residues thereof. Further, other radicals, such as halides, etc., derived from the metal halide or organometal halide reacted therewith may be additionally attached to the metal atom.

The organometal compounds of this invention may be described as being covalent and containing a sigma metal-nitrogen bond. To the alpha nitrogen atom there is attached an organic radical such as, for example, a phenyl group. Additionally, the other organic radical is attached to the terminal imino nitrogen atom. The triazeno group may, however, act as a bidentate intra-, or inter-molecular chelating ligand, depending on the metal atom.

The compounds of this invention are useful in various diverse manners. For example the compounds act as polymerization chain transfer agents and inhibitors, but may also be used as activators in the polymerization of ethylenically unsaturated monomers such as styrene, acrylamide and acrylonitrile. Additionally, the 1,3-diphenyltriazeno ligand enables the compounds to be used as rubber cross-linking agents.

Having thus described the invention, what is claimed and desired to be secured by Letters Patent of the United States is:

1. An organometallic compound selected from the group consisting of tris-(1,3-diphenyltriazeno) aluminum, bis-(1,3-diphenyltriazeno) tin dichloride, bis-(1,3-diphenyltriazeno) dimethyltin, bis-(1,3-diphenyltriazeno) phenyl-

TABLE 2

| Example | MX$_n$ | Product | M.P. (° C.) | | C | H | N | Metal | Hal | Mol. Wt.ª | Method (Solvent, hr. shaken) |
|---|---|---|---|---|---|---|---|---|---|---|---|
| 1 | AlCl$_3$ | Al(dpt)$_3$ | 280 | Calc'd | 70.23 | 4.91 | 20.48 | 4.38 | ——— | 617, 616 | Benzene, 20. |
|   |   |   |   | Observed | 70.28 | 4.88 | 20.50 | 4.27 | ——— | 620 |   |
| 2 | SnCl$_4$ | Sn(dpt)$_2$Cl$_2$ | 190 | Calc'd | 49.52 | 3.46 | 14.44 | 20.39 | 12.18 | 565, 582 | Et$_2$O, 20. |
|   |   |   |   | Observed | 49.78 | 3.75 | 14.32 | 20.62 | 12.06 | 587 |   |
| 3 | Me$_2$SnCl$_2$ | Me$_2$Sn(dpt)$_2$ | 164 | Calc'd | 57.71 | 4.83 | 15.53 | 21.93 | ——— | 541 | Et$_2$O, 5. |
|   |   |   |   | Observed | 57.77 | 4.98 | 15.65 | 21.81 | ——— | 529 |   |
| 4 | PhSnCl$_3$ | PhSn(dpt)$_2$Cl | 203 | Calc'd | 57.77 | 4.04 | 13.47 | 19.03 | 5.68 | 624 | Et$_2$O, 20. |
|   |   |   |   | Observed | 57.61 | 4.09 | 13.17 | 19.29 | 5.92 | 630 |   |
| 5 | Ph$_3$SnCl | Ph$_3$Sn(dpt) | 85 | Calc'd | 65.96 | 4.61 | 7.69 | 21.73 | ——— | 546 | Et$_2$O, 40. |
|   |   |   |   | Observed | 66.05 | 4.66 | 7.39 | 21.78 | ——— | 472 |   |
| 6 | CdI$_2$ | Cd(dpt)$_2$ | b 284 | Calc'd | 57.09 | 3.99 | 16.65 | 22.27 | ——— | (e) 505 | Et$_2$O, 40. |
|   |   |   |   | Observed | 57.33 | 3.99 | 16.52 | 21.78 | ——— |   |   |
| 7 | TiCl$_4$ | Ti(dpt)$_3$Cl | 113 | Calc'd | 64.33 | 4.50 | 18.76 | 7.13 | 5.28 | 384, 672 | Pet. ether, 40. |
|   |   |   |   | Observed | 64.42 | 4.34 | 19.11 | 6.21 | 5.19 | 382 |   |
| 8 | ZrCl$_4$ | Zr(dpt)$_4$ | 230 | Calc'd | 65.80 | 4.60 | 19.19 | 10.41 | ——— | 839, 876 | Et$_2$O, 20. |
|   |   |   |   | Observed | 65.77 | 4.67 | 19.44 | 10.83 | ——— | 887 |   |
| 9 | FeCl$_3$ | Fe(dpt)$_3$ | b 162 | Calc'd | 67.08 | 4.69 | 19.56 | 8.67 | ——— | 645 | Pet. ether, 10. |
|   |   |   |   | Observed | 67.33 | 4.80 | 19.57 | 8.98 | ——— | 630 |   |

ª Determined cryoscopically in benzene.
b Melts with decomposition.
c The complund is insufficiently soluble for moelcular weight determination.

In addition to the data set forth in Table 2, above, positive identification of the compounds obtained was made by means of infrared analysis and hydrolysis of the metal compounds to obtain the free triazene. The products obtained in Examples 1–9 are as follows:

Example 1.—Tris(-1,3-diphenyltriazeno)aluminum
Example 2.—Bis(-1,3-diphenyltriazeno)tin dichloride
Example 3.—Bis(-1,3-diphenyltriazeno)dimethyl tin
Example 4.—Bis(-1,3-diphenyltriazeno)phenyl tin chloride
Example 5.—1,3-diphenyltriazeno triphenyl tin
Example 6.—Bis(-1,3-diphenyltriazeno)cadmium
Example 7.—Tris(-1,3-diphenyltriazeno)titanium (IV) chloride tin chloride, 1,3-diphenyltriazenotriphenyltin, bis-(1,3-diphenyltriazeno) cadmium, tris-(1,3-diphenyltriazeno) titanium (IV) chloride, tetrakis-(1,3-diphenyltriazeno) zirconium (IV) and tris-(1,3-diphenyltriazeno) iron (III).

2. The method of preparing an organometallic compound which consists essentially of reacting in the presence of a diluent taken from the group consisting of liquid hydrocarbons and ethers and in an anhydrous and inert atmosphere 1,3-diphenyltriazeno silver with a compound selected from the group consisting of compounds having the formulae MX$_n$ and R$_m$MX$_n$ wherein M is a metal selected from the group consisting of Al, Sn, Cd, Ti, Zr and Fe; R is an organic radical selected from the group consisting of methyl or phenyl; X is selected from the group consisting of Cl, Br or I and $m$ is an integer from 1 to 3 and $n$ is an integer from 1 to 4 and recovering from the reaction mixture a metal-1,3-diphenyltriazene and a silver halide.

3. The method of claim 2 wherein $R_mMX_n$ is selected from the group consisting of $M_2SnCl_2$, $PhSnCl_3$ and $Ph_3SnCl$ wherein M is methyl and Ph is phenyl.

4. The method of claim 2 wherein $MX_n$ is selected from the group consisting of $AlCl_3$, $SnCl_4$, $CdI_2$, $TiCl_4$, $ZnCl_4$ and $FeCl_3$.

5. The method of claim 2 wherein said diluent is selected from diethyl ether, benzene and petroleum ether.

6. The method of claim 2 wherein said inert atmosphere is selected from nitrogen, helium and argon.

References Cited

Dwyer, Journal American Chemical Society, vol. 63, 1941, pp. 78–81.

Harris et al., Chemical Society Journal, 1959, pp. 3728–36.

Metal-Organic Compounds, American Chemical Society, 1959, p. 53.

CHARLES B. PARKER, *Primary Examiner.*

DONALD M. PAPUGA, *Assistant Examiner.*

U.S. Cl. X.R.

260—429, 2, 94.6, 94.8, 94.9, 768